(12) United States Patent
Mackay

(10) Patent No.: US 6,264,864 B1
(45) Date of Patent: Jul. 24, 2001

(54) PROCESS FOR PRODUCING POLYOLEFIN MICROPOROUS BREATHABLE FILM

(75) Inventor: John H. Mackay, Lake Zurich, IL (US)

(73) Assignee: Exxon Chemical Patents Inc., Baytown, TX (US)

(*) Notice: Subject to any disclaimer, the term of this patent is extended or adjusted under 35 U.S.C. 154(b) by 0 days.

(21) Appl. No.: 09/418,405

(22) Filed: Oct. 14, 1999

Related U.S. Application Data

(60) Provisional application No. 60/104,452, filed on Oct. 16, 1998, and provisional application No. 60/104,985, filed on Oct. 20, 1998.

(51) Int. Cl.$^7$ .................. B29C 55/06; B29C 55/08; B29C 55/12; B29C 55/18

(52) U.S. Cl. .................. 264/154; 264/210.6; 264/288.8; 264/290.2

(58) Field of Search .................. 264/41, 154, 210.6, 264/288.8, 290.2

(56) References Cited

U.S. PATENT DOCUMENTS

| | | |
|---|---|---|
| Re. 28,606 | 11/1975 | Ikeda et al. . |
| Re. 28,608 | 11/1975 | Dixon . |
| 2,896,626 | 7/1959 | Voigtman . |
| 3,233,029 | 2/1966 | Rasmussen . |
| 3,299,174 | 1/1967 | Kuhre et al. . |
| 3,378,512 | 4/1968 | Hamed et al. . |
| 3,407,253 | 10/1968 | Yoshimura et al. . |
| 3,424,649 | 1/1969 | Nyberg et al. . |
| 3,426,754 | 2/1969 | Bierebaum et al. . |
| 3,562,356 | 2/1971 | Nyberg et al. . |
| 3,642,967 | 2/1972 | Doll . |
| 3,654,929 | 4/1972 | Nilsson et al. . |
| 3,678,134 | 7/1972 | Middlebrook . |
| 3,683,917 | 8/1972 | Comerford . |
| 3,738,904 | 6/1973 | Ikeda et al. . |
| 3,832,267 | 8/1974 | Liu . |
| 3,837,773 | 9/1974 | Raley . |
| 3,840,418 | 10/1974 | Sabee . |
| 3,844,865 | 10/1974 | Elton et al. . |

(List continued on next page.)

FOREIGN PATENT DOCUMENTS

| | | |
|---|---|---|
| 577644 | 9/1988 | (AU) . |
| 621048 | 4/1989 | (AU) . |
| 1296225 | 2/1992 | (CA) . |
| 1311181 | 12/1992 | (CA) . |
| 1322082 | 9/1993 | (CA) . |
| 2144737 | 3/1994 | (CA) . |
| 2130192 | 2/1998 | (CA) . |
| 2 035 117 | 1/1971 | (DE) . |
| 34 36 065 A1 | 4/1986 | (DE) . |
| 43 11 422 A1 | 10/1994 | (DE) . |
| 38 50 987 T2 | 12/1994 | (DE) . |
| 32 33 693 C2 | 1/1995 | (DE) . |
| 32 804 A2 | 7/1981 | (EP) . |
| 114 964 A1 | 8/1984 | (EP) . |
| 119 815 A2 | 9/1984 | (EP) . |
| 119 827 A2 | 9/1984 | (EP) . |
| 193 938 A2 | 9/1986 | (EP) . |
| 114 964 B1 | 11/1986 | (EP) . |

(List continued on next page.)

OTHER PUBLICATIONS

Van A. Wente "Superfine Thermoplastic Fibers" Industrial Engineering Chemistry, Aug. 1956, vol. 48, No. 8, pp. 1342–1346.

*Primary Examiner*—Leo B. Tentoni
(74) *Attorney, Agent, or Firm*—Thomason, Moser & Patterson, L.L.P.

(57) ABSTRACT

Polyolefin/filler breathable films may be produced by machine or transverse direction orientation using interdigitating grooved rollers. Biaxial orientation to similarly produce breathable films may be accomplished by the same method. By heating the rollers, the breathability of the film is increased without increasing the depth of engagement of the interdigitating rollers.

2 Claims, 2 Drawing Sheets

U.S. PATENT DOCUMENTS

| | | |
|---|---|---|
| 3,870,593 | 3/1975 | Elton et al. . |
| 3,894,827 | 7/1975 | Raley et al. . |
| 3,903,234 | 9/1975 | Ikeda et al. . |
| 3,927,144 | 12/1975 | Hayashi et al. . |
| 3,941,859 | 3/1976 | Batiuk et al. . |
| 3,969,562 | 7/1976 | Suzuki . |
| 4,076,698 | 2/1978 | Anderson et al. . |
| 4,091,164 | 5/1978 | Schwarz . |
| 4,116,892 | 9/1978 | Schwarz . |
| 4,116,914 | 9/1978 | Coran et al. . |
| 4,131,654 | 12/1978 | Herman et al. . |
| 4,132,698 | 1/1979 | Gessler et al. . |
| 4,134,951 | 1/1979 | Dow et al. . |
| 4,135,023 | 1/1979 | Lloyd et al. . |
| 4,144,008 | 3/1979 | Schwarz . |
| 4,153,664 | 5/1979 | Sabee . |
| 4,153,751 | 5/1979 | Schwarz . |
| 4,171,411 | 10/1979 | Ehrenfreund . |
| 4,173,612 | 11/1979 | Kelly . |
| 4,205,021 | 5/1980 | Morita et al. . |
| 4,210,709 | 7/1980 | Doi et al. . |
| 4,212,787 | 7/1980 | Matsuda et al. . |
| 4,220,579 | 9/1980 | Rinehart . |
| 4,220,879 | 9/1980 | Hoshimi et al. . |
| 4,223,059 | 9/1980 | Schwarz . |
| 4,243,576 | 1/1981 | Fischer et al. . |
| 4,251,585 | 2/1981 | Schwarz . |
| 4,253,461 | 3/1981 | Strickland et al. . |
| 4,277,578 | 7/1981 | Yoshimura et al. . |
| 4,285,100 | 8/1981 | Schwarz . |
| 4,289,832 | 9/1981 | Schwarz . |
| 4,298,647 | 11/1981 | Cancio et al. . |
| 4,303,571 | 12/1981 | Jansen et al. . |
| 4,303,712 | 12/1981 | Woodroof . |
| 4,303,714 | 12/1981 | Mercer . |
| 4,318,408 | 3/1982 | Korpman . |
| 4,319,950 | 3/1982 | Sznopek et al. . |
| 4,329,309 | 5/1982 | Kelly . |
| 4,331,622 | 5/1982 | Doi et al. . |
| 4,335,193 | 6/1982 | Doi et al. . |
| 4,344,999 | 8/1982 | Gohlke . |
| 4,350,655 | 9/1982 | Hoge . |
| 4,351,784 | 9/1982 | Thomas et al. . |
| 4,352,355 | 10/1982 | Mesek et al. . |
| 4,353,945 | 10/1982 | Sampson . |
| 4,357,439 | 11/1982 | Blumel et al. . |
| 4,368,565 | 1/1983 | Schwarz . |
| 4,378,067 | 3/1983 | Butler et al. . |
| 4,380,564 | 4/1983 | Cancio et al. . |
| 4,402,688 | 9/1983 | Julemont . |
| 4,418,112 | 11/1983 | Toyoda et al. . |
| 4,425,127 | 1/1984 | Suzuki et al. . |
| 4,425,129 | 1/1984 | Karami . |
| 4,427,737 | 1/1984 | Cilento et al. . |
| 4,435,141 | 3/1984 | Weisner et al. . |
| 4,436,520 | 3/1984 | Lipko et al. . |
| 4,438,167 | 3/1984 | Schwarz . |
| 4,440,911 | 4/1984 | Inoue et al. . |
| 4,449,977 | 5/1984 | Korpman . |
| 4,450,026 | 5/1984 | Pieniak et al. . |
| 4,460,646 | 7/1984 | Inoue et al. . |
| 4,465,729 | 8/1984 | Cancio et al. . |
| 4,472,328 | 9/1984 | Sugitomo et al. . |
| 4,476,180 | 10/1984 | Wnuk . |
| 4,479,989 | 10/1984 | Mahal . |
| 4,480,061 | 10/1984 | Coughlin et al. . |
| 4,485,133 | 11/1984 | Ohtsuka et al. . |
| 4,517,714 | 5/1985 | Sneed et al. . |
| 4,525,531 | 6/1985 | Zukosky et al. . |
| 4,527,989 | 7/1985 | Karami . |
| 4,534,769 | 8/1985 | De Jonckheere et al. . |
| 4,535,020 | 8/1985 | Thomas et al. . |
| 4,585,447 | 4/1986 | Karami . |
| 4,585,604 | 4/1986 | Okuyama et al. . |
| 4,590,020 | 5/1986 | Itaba et al. . |
| 4,590,202 | 5/1986 | Remy . |
| 4,626,252 | 12/1986 | Nishizawa et al. . |
| 4,636,340 | 1/1987 | Itaba et al. . |
| 4,639,487 | 1/1987 | Hazelton et al. . |
| 4,639,949 | 2/1987 | Ales et al. . |
| 4,640,859 | 2/1987 | Hansen et al. . |
| 4,657,539 | 4/1987 | Hasse . |
| 4,663,220 | 5/1987 | Wisneski et al. . |
| 4,673,619 | 6/1987 | Itaba et al. . |
| 4,681,580 | 7/1987 | Reising et al. . |
| 4,681,781 | 7/1987 | Murray et al. . |
| 4,684,578 | 8/1987 | Inoue et al. . |
| 4,704,238 | 11/1987 | Okuyama et al. . |
| 4,705,812 | 11/1987 | Ito et al. . |
| 4,713,068 | 12/1987 | Wang et al. . |
| 4,713,069 | 12/1987 | Wang et al. . |
| 4,714,735 | 12/1987 | Hodgson, Jr. et al. . |
| 4,716,197 | 12/1987 | Seiss et al. . |
| 4,719,144 | 1/1988 | Kamat . |
| 4,721,592 | 1/1988 | Fruehauf et al. . |
| 4,725,481 | 2/1988 | Ostapchenko . |
| 4,734,324 | 3/1988 | Hill . |
| 4,740,258 | 4/1988 | Breitscheidel . |
| 4,758,297 | 7/1988 | Calligarich . |
| 4,775,375 | 10/1988 | Aledo . |
| 4,777,073 | 10/1988 | Sheth . |
| 4,777,703 | 10/1988 | Knox . |
| 4,791,144 | 12/1988 | Nagou et al. . |
| 4,793,956 | 12/1988 | Nogiwa et al. . |
| 4,806,300 | 2/1989 | Walton et al. . |
| 4,808,252 | 2/1989 | Lash . |
| 4,814,124 | 3/1989 | Aoyama et al. . |
| 4,820,590 | 4/1989 | Hodgson, Jr. et al. . |
| 4,824,718 | 4/1989 | Hwang . |
| 4,833,172 | 5/1989 | Schwarz et al. . |
| 4,848,564 | 7/1989 | Scheller et al. . |
| 4,877,679 | 10/1989 | Leatherman et al. . |
| 4,878,974 | 11/1989 | Kagawa . |
| 4,879,078 | 11/1989 | Antoon, Jr. . |
| 4,902,553 | 2/1990 | Hwang et al. . |
| 4,921,653 | 5/1990 | Aoyama et al. . |
| 4,921,749 | 5/1990 | Bossaert et al. . |
| 4,929,303 | 5/1990 | Sheth . |
| 4,957,943 | 9/1990 | McAllister et al. . |
| 4,977,014 | 12/1990 | Mitchell et al. . |
| 4,978,570 | 12/1990 | Heyn et al. . |
| 5,008,204 | 4/1991 | Stehling . |
| 5,008,296 | 4/1991 | Antoon, Jr. et al. . |
| 5,026,798 | 6/1991 | Canich . |
| 5,032,450 | 7/1991 | Rechlicz et al. . |
| 5,034,078 | 7/1991 | Hodgson, Jr. et al. . |
| 5,035,338 | 7/1991 | Kaufhold et al. . |
| 5,055,338 | 10/1991 | Sheth et al. . |
| 5,066,526 | 11/1991 | German, Jr. . |
| 5,068,138 | 11/1991 | Mitchell et al. . |
| 5,145,747 | 9/1992 | Jottier . |
| 5,167,652 | 12/1992 | Mueller . |
| 5,169,712 | 12/1992 | Tapp . |
| 5,174,231 | 12/1992 | White . |
| 5,182,069 | 1/1993 | Wick . |
| 5,198,401 | 3/1993 | Turner et al. . |
| 5,206,075 | 4/1993 | Hodgson, Jr. . |
| 5,241,031 | 8/1993 | Mehta . |
| 5,272,236 | 12/1993 | Lai et al. . |
| 5,278,272 | 1/1994 | Lai et al. . |
| 5,296,184 | 3/1994 | Wu et al. . |

| | | |
|---|---|---|
| 5,317,035 | 5/1994 | Jacoby et al. . |
| 5,322,728 | 6/1994 | Davet et al. . |
| 5,358,792 | 10/1994 | Mehta et al. . |
| 5,364,695 | 11/1994 | Gurewitz . |
| 5,376,439 | 12/1994 | Hodgson et al. . |
| 5,382,461 | 1/1995 | Wu . |
| 5,382,630 | 1/1995 | Stehling et al. . |
| 5,385,769 | 1/1995 | Wick . |
| 5,399,396 | 3/1995 | Ohlsson et al. . |
| 5,409,761 | 4/1995 | Langley . |
| 5,415,905 | 5/1995 | Middlesworth et al. . |
| 5,445,862 | 8/1995 | Kaneko et al. . |
| 5,447,788 | 9/1995 | Rhim et al. . |
| 5,451,450 | 9/1995 | Erderly et al. . |
| 5,470,811 | 11/1995 | Jejelowo et al. . |
| 5,472,775 | 12/1995 | Obijeski et al. . |
| 5,500,260 | 3/1996 | Halle et al. . |
| 5,500,360 | 3/1996 | Ahlquist et al. . |
| 5,525,659 | 6/1996 | Falla et al. . |
| 5,549,777 | 8/1996 | Langdon et al. . |
| 5,558,930 | 9/1996 | DiPoto . |
| 5,560,974 | 10/1996 | Langley . |
| 5,565,250 | 10/1996 | Ohlsson et al. . |
| 5,571,619 | 11/1996 | McAlpin et al. . |
| 5,575,785 | 11/1996 | Gryskiewicz et al. . |
| 5,580,910 | 12/1996 | Isaac et al. . |
| 5,580,914 | 12/1996 | Falla et al. . |
| 5,674,944 | 10/1997 | Falla et al. . |
| 5,690,949 | 11/1997 | Weimer et al. . |
| 5,695,868 | 12/1997 | McCormack . |
| 5,695,871 | 12/1997 | Tallentire et al. . |
| 5,738,111 | 4/1998 | Weimer et al. . |
| 5,783,270 | 7/1998 | Fischer et al. . |
| 5,814,569 | 9/1998 | Suzuki et al. . |
| 5,865,926 | 2/1999 | Wu et al. . |
| 5,910,225 | 6/1999 | McAmish et al. . |
| 5,995,187 | 9/1999 | McCormack et al. . |
| B1 3,860,003 | 4/1989 | Buell . |

FOREIGN PATENT DOCUMENTS

| | | |
|---|---|---|
| 201 331 A2 | 11/1986 | (EP) . |
| 219 198 A1 | 4/1987 | (EP) . |
| 227 037 A2 | 7/1987 | (EP) . |
| 232 060 A3 | 8/1987 | (EP) . |
| 276 100 A1 | 1/1988 | (EP) . |
| 119 827 B1 | 7/1988 | (EP) . |
| 283 200 A2 | 9/1988 | (EP) . |
| 283 200 A3 | 9/1988 | (EP) . |
| 283 200 B1 | 9/1988 | (EP) . |
| 288 021 A2 | 10/1988 | (EP) . |
| 288 021 A3 | 10/1988 | (EP) . |
| 288 021 B1 | 10/1988 | (EP) . |
| 201 331 B1 | 12/1989 | (EP) . |
| 352 802 A2 | 1/1990 | (EP) . |
| 352 802 A3 | 1/1990 | (EP) . |
| 361 865 A2 | 4/1990 | (EP) . |
| 361 865 A3 | 4/1990 | (EP) . |
| 361 865 B1 | 4/1990 | (EP) . |
| 193 938 B1 | 6/1990 | (EP) . |
| 385 599 A2 | 9/1990 | (EP) . |
| 385 599 A3 | 9/1990 | (EP) . |
| 227 037 B1 | 7/1991 | (EP) . |
| 219 198 B1 | 10/1991 | (EP) . |
| 550 115 A2 | 12/1992 | (EP) . |
| 550 115 A3 | 12/1992 | (EP) . |
| 598 970 A1 | 6/1994 | (EP) . |
| 691 203 A1 | 1/1996 | (EP) . |
| 598 970 B1 | 5/1996 | (EP) . |
| 742 248 A1 | 11/1996 | (EP) . |
| 629 151 B1 | 12/1996 | (EP) . |
| 662 988 B1 | 2/1997 | (EP) . |
| 769 525 A1 | 4/1997 | (EP) . |
| 682 678 B1 | 12/1998 | (EP) . |
| 604 731 B1 | 6/1999 | (EP) . |
| 598 970 B2 | 4/2000 | (EP) . |
| 2 074 338 | 9/1971 | (FR) . |
| 2 446 176 | 8/1980 | (FR) . |
| 1 454 218 | 11/1976 | (GB) . |
| 2 101 468 | 1/1983 | (GB) . |
| 2 115 702 | 9/1983 | (GB) . |
| 2 137 632 | 10/1984 | (GB) . |
| 2 151 538 | 7/1985 | (GB) . |
| 2 178 433 | 2/1987 | (GB) . |
| 2 285 408 | 7/1995 | (GB) . |
| 2 290 052 | 12/1995 | (GB) . |
| 48-60774 | 8/1973 | (JP) . |
| 51-30856 | 3/1976 | (JP) . |
| 54-120646 | 9/1979 | (JP) . |
| 54-120658 | 9/1979 | (JP) . |
| 55-110141 | 8/1980 | (JP) . |
| 57/02350 | 1/1982 | (JP) . |
| 57-117038 | 7/1982 | (JP) . |
| 57-117039 | 7/1982 | (JP) . |
| 58-129034 | 8/1983 | (JP) . |
| 61-9448 | 1/1986 | (JP) . |
| 61-284439 | 12/1986 | (JP) . |
| 62-169642 | 7/1987 | (JP) . |
| 62-176843 | 8/1987 | (JP) . |
| 62-179543 | 8/1987 | (JP) . |
| 62-282003 | 12/1987 | (JP) . |
| 64-49619 | 2/1989 | (JP) . |
| 64-79620 | 3/1989 | (JP) . |
| 1-144431 | 6/1989 | (JP) . |
| 1-235439 | 9/1989 | (JP) . |
| 1-264031 | 10/1989 | (JP) . |
| 1-266150 | 10/1989 | (JP) . |
| 2-36938 | 2/1990 | (JP) . |
| 2-179543 | 7/1990 | (JP) . |
| 276636 | 11/1990 | (JP) . |
| 3-221540 | 9/1991 | (JP) . |
| 6-29842 | 2/1994 | (JP) . |
| 7-116429 | 5/1995 | (JP) . |
| 7-118431 | 5/1995 | (JP) . |
| 175038 B1 | 2/1984 | (PL) . |
| 93/03093 | 2/1993 | (WO) . |
| 93/16863 | 9/1993 | (WO) . |
| 94/01276 | 1/1994 | (WO) . |
| 94/01376 | 1/1994 | (WO) . |
| 94/06857 | 3/1994 | (WO) . |
| 94/18263 | 8/1994 | (WO) . |
| 95/02630 | 1/1995 | (WO) . |
| 95/03765 | 2/1995 | (WO) . |
| 95/07314 | 3/1995 | (WO) . |
| 95/09199 | 4/1995 | (WO) . |
| 95/16562 | 6/1995 | (WO) . |
| 96/19346 | 6/1996 | (WO) . |
| 96/39032 | 12/1996 | (WO) . |
| 98/04397 | 2/1998 | (WO) . |
| 98/05502 | 2/1998 | (WO) . |
| 98/24834 | 6/1998 | (WO) . |
| 98/29247 | 7/1998 | (WO) . |
| 98/29481 | 7/1998 | (WO) . |
| WO 98/29481 | 7/1998 | (WO) . |
| WO 98/29504 | 7/1998 | (WO) . |
| 98/58799 | 12/1998 | (WO) . |
| WO 99/23139 | 5/1999 | (WO) . |

PROCESS FOR PRODUCING POLYOLEFIN MICROPOROUS BREATHABLE FILM

This application claims the benefit of U.S. Provisional Patent Application Ser. No. 60/104,452 filed Oct. 16, 1998 and U.S. Provisional Patent Application Ser. No. 60/104,985 filed Oct. 20, 1998.

BACKGROUND OF THE INVENTION

1. Field

This invention relates generally to an improved polyolefin microporous breathable film and method of making same. More specifically, this invention is directed toward a process by which increased Water Vapor Transmission Rate (WVTR) and enhanced film appearance can be realized with substantially the same film formulation and orientation.

2. Background

Preparation of films having good WVTR from highly filled polymers, usually polyolefins, is well known in the art. In the past, a combination of polyolefin, usually a polyethylene, with a filler, usually $CaCO_3$, is widely used as a film with good WVTR, often, but not necessarily, in combination with non-woven polymers for use in diapers, adult incontinence devices, feminine hygiene articles, surgical garments, housewrap composites, protective apparel, roofing materials and the like.

The use of interdigitating rolls to orient films or non-wovens is also well known in the art. In some cases this process is referred to as cold stretching. To increase the WVTR of films, while employing interdigitating technology, it has been necessary to increase the level of filler in the polyolefin/filler blend, or to increase the depth of interengagement of the orienting rollers—both of which have technical limits, and which may have a serious negative impact on important physical properties of the resulting film. The technical limits of depth of engagement of the inter-digitating rolls and $CaCO_3$ loading restrict film breathability level.

Also, it is desirable for many applications of breathable film, such as disposable diapers, adult incontinence products, and feminine hygiene devices, that some visual evidence of a difference between breathable and non-breathable films exist. It is thought that this product differentiation could be of benefit to the consumer, as well as the manufacturer of the disposable products.

SUMMARY

We have discovered that applying heat to interdigitating rollers results in a substantial improvement in orientation effectiveness (WVTR increases), and imparts a third dimensionality to the film which differentiates it from other breathable films. In addition, a new control is provided for the adjustment of film breathability, i.e., rather than require a formulation change, or adjustment to the depth of activation of the interdigitating rollers, to control WVTR levels, roller temperature may be adjusted. As can be seen from the following examples, with all other factors constant, an increase in the temperature of the interdigitating rolls from 70° F. to 140° F., increases WVTR from 1900 gm/sqm/day to 4100 gm/sqm/day.

BRIEF DESCRIPTION OF THE DRAWINGS

A better understanding of the Process for Producing Polyolefin Microporous Breathable Film may be obtained by reference to the following drawing figures together with the detailed description.

DETAILED DESCRIPTION

Introduction

Figure 1:
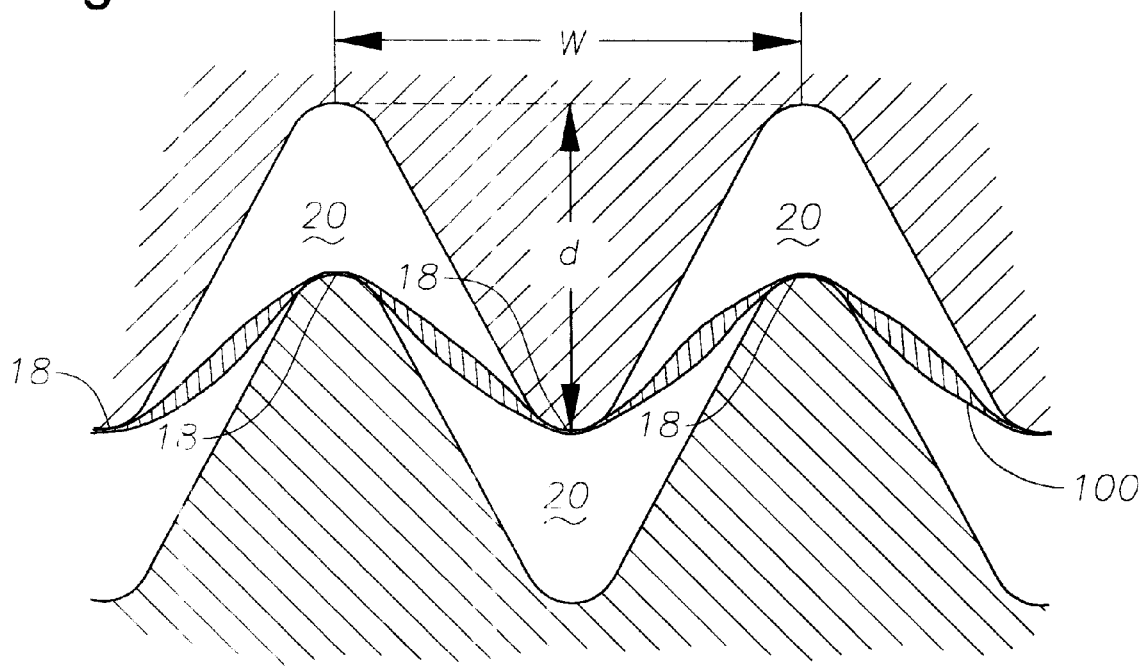
FIG. 1 shows the geometry of interdigitating rollers.

This invention concerns polyolefin/filler based breathable films. While initial work was executed on a polypropylene based product, it will be shown that the disclosed process is effective for all polyolefin materials.

This invention further includes certain polyolefins, their conversion into fabricated articles such as films, articles made from such films, and applications in which such articles having high WVTR combined with good physical properties are desirable. The resulting films, and film composites, (including coextruded and laminated films) have combinations of properties rendering them superior and unique to films or film composites previously available. The films disclosed herein are particularly well suited for use in producing certain classes of high WVTR films, consumer and industrial articles using the films in combination with, for instance, polymeric woven or non-woven materials. Such consumer articles include, but are not limited to diapers, adult incontinence devices, feminine hygiene articles, medial and surgical gowns, medical drapes, industrial apparel, building products such as "house-wrap", roofing components, and the like made using one or more of the films disclosed herein. Additionally, the films of the present invention may also be used in metallized films with a high WVTR, according to the disclosure of U.S. Pat. No. 5,055,338, which is to be incorporated herein by reference in its entirety.

Production of the Films

Films contemplated by certain embodiments of the present invention may be made utilizing a polyolefin, by film processes including blown molding, casting, and cast melt embossing. The preferred process is a cast melt embossed film process. In extrusion processes, the films of the present invention can be formed into a single layer film, or may be one layer or more of a multi-layer film or film composite. Alternatively, the polyolefin films described in this disclosure can be formed or utilized in the form of a resin blend where the blend components can function to modify the WVTR, the physical properties, the draw-down, the sealing, the cost, or other parameters. Both blend components and the parameters provided thereby will be well known to those of ordinary skill in the art. The breathable films of the present invention may also be included in laminated structures. As long as a film, multi-layer film, or laminated structure includes one or more polyolefin/filler film layers having the WVTR, or draw-down, and the like of the film, such film, multilayer film, or laminated structure will be understood to be contemplated as an embodiment of the present invention.

Polyolefin Precursor Film Component

The polyolefin precursor component can be any film forming polyolefin including polyethylene and polypropylene, ethylene polar comonomer polymers, ethylene α-olefin copolymers and combinations hereof.

| Suitable Polyolefins and Relative Benefits | | | | |
|---|---|---|---|---|
| Polypropylene | Impact | Tear | Softness | Drawdown |
| Metallocene Homo-polymers and Copolymers | preferred | preferred | preferred | most preferred |
| Random Copolymer PP | more preferred | more preferred | more preferred | more preferred |
| Impact Copolymer polypropylene | most preferred | most preferred | most preferred | preferred |
| Homopolymer PP | preferred | preferred | preferred | preferred |
| Exxon LD 3003 | preferred | preferred | preferred | preferred |

It will be understood that, in general, we contemplate that a large number of polyolefins will be useful in the techniques and applications described herein. Also included in the group of polyolefins that are contemplated as embodiments of this invention are metallocene catalyzed polyethylenes, both linear low density and very low density (0.88 to 0.935 g/cm3), high density polyethylene (0.935–0.970 g/cm3), Ziegler-Natta catalyzed linear low density polyethylene, conventional high pressure low density polyethylene (LDPE), and combinations thereof. Various elastomers or other soft polymers may be blended with the majority polyolefin component, these include styrene-isoprene-styrene (styrenic block co-polymer), styrene-butadiene-styrene (styrenic block co-polymer), styrene-ethylene/butylene-styrene (styrenic block co-ploymer), ethylene-propylene (rubber), Ethylene-propylene-diene-modified (rubber), Ethylene-vinyl-acetate, Ethylene-methacrylate, Ethylene-ethyl-acrylate, Ethylene-butyl-acrylate.

Filler

Fillers useful in this invention may be any inorganic or organic material having a low affinity for and a significantly lower elasticity than the film forming polyolefin component. Preferably a filler should be a rigid material having a non-smooth hydrophobic surface, or a material which is treated to render its surface hydrophobic. The preferred mean average particle size of the filler is between about 0.5–5.0 microns for films generally having a thickness of between about 1 to about 6 mils prior to stretching.

Examples of the inorganic fillers include calcium carbonate, talc, clay, kaolin, silica, diatomaceous earth, magnesium carbonate, barium carbonate, magnesium, sulfate, barium sulfate, calcium sulfate, aluminum hydroxide, zinc oxide, magnesium hydroxide, calcium oxide, magnesium oxide, titanium oxide, alumina, mica, glass powder, zeolite, silica clay, etc. Calcium carbonate ($CaCO_3$) is particularly preferred for its low cost, its whiteness, its inertness, and its availability. The selected inorganic filler such as calcium carbonate is preferably surface treated to be hydrophobic so that the filler can repel water to reduce agglomeration. Also, the surface treatment of the filler should improve binding of the filler to the polyolefin precursor while allowing the filler to be pulled away from the precursor film under stress. A preferred coating for the filler is calcium stearate which is FDA compliant and readily available.

Organic fillers such as wood powder, and other cellulose type powders may be used. Polymer powders such as Teflon® powder and Keviar® powder can also be used.

The amount of filler added to the polyolefin precursor depends on the desired properties of the film including dart impact strength, tear strength, WVTR, and stretchability. However, it is believed that a film with good WVTR generally cannot be produced as is taught herein with an amount of filler less than about twenty percent (20%) by weight of the polyolefin/filler blend.

The minimum amount of filler (about twenty percent by weight) is needed to assure the interconnection within the polyolefin precursor film of voids created at the situs of the filler—particularly by the stretching operation to be subsequently performed. Further, it is believed that useful films could not be made with an amount of the filler in excess of about seventy percent (70%) by weight of the polyolefin/filler composition. Higher amounts of filler may cause difficulty in compounding and significant losses in strength of the final breathable film. Preferred ranges include about 30% to about 70% by weight, more preferably from about 40% to about 60% by weight.

While a broad range of fillers has been described at a broad range of inclusion parameters based on weight percentages, still other embodiments of the present invention are contemplated. For instance, fillers with much higher or much lower specific gravity may be included with the polyolefin precursor at amounts outside the weight ranges disclosed. Such combinations will be understood to be contemplated as embodiments of our invention as long as the final film, after orientation, has WVTR, or draw down similar to that described herein.

Film Physical Property Modification

It was found that the addition of small amounts of low density polyethylene to the polyolefin/filler blend allowed film extrusion at higher throughput levels with some majority polymers. Low density polyethylene with a melt flow index of about 0.9 to 25.0 grams per ten minutes (12.0 grams per ten minutes being preferred), and a density of about 0.900 to 0.930 may be used.

Further improvements in film impact and tear strength are possible by the addition of plastomers, elastomers, styrenic block co-polymers (SIS, SBS, SEBS), or rubbers. Material grades included are:

| Property Improvement Materials | | | |
|---|---|---|---|
| Supplier | Grade | Melt Flow Index | Density |
| Exxon Chemical | Exact 3139 | 7.5 | .900 |
| Exxon Chemical | Exact 4044 | 16.5 | .895 |
| Exxon Chemical | Exact 9095 | 2.2 | .893 |
| Exxon Chemical | Exact 3131 | 3.5 | .900 |
| Exxon Chemical | Paxon SLX 9106 | 2.0 | .900 |
| Exxon Chemical | Paxon SLX 9101 | 3.5 | .900 |
| Dexco | Vector 4211 | 13 | |
| Dexco | Vector 4411 | 40 | |
| Exxon | Vistalon 3708 | | |
| Exxon | Vistalon 3030 | | |
| Shell | Kraton G1657 | 8 | SEBS |
| Union Carbide | UC 9042 | 5.1 | .900 |
| Union Carbide | UC 1085 | 0.8 | .884 |

Stretching or Orienting

Final preparation of a breathable film is achieved by stretching the filled polyolefin precursor film to form interconnected voids. Stretching or "orientation" is achieved by incrementally orienting the polyolefin precursor in the machine direction, transverse direction, or both. Films can be incrementally oriented by a number of mechanical techniques, however, the preferred technique is to stretch the film through pairs of interdigitating rollers, as shown in FIG. 1. Therein it may be seen that the film is contracted by the apex 18 of a plurality of teeth spaced a distance or pitch (W) apart. The apex 18 of each tooth extends into the open space 20 between the teeth on an opposing roller. The amount of interengagement depends both on the tooth depth (d) and the relative position of the rollers.

Figure 2:
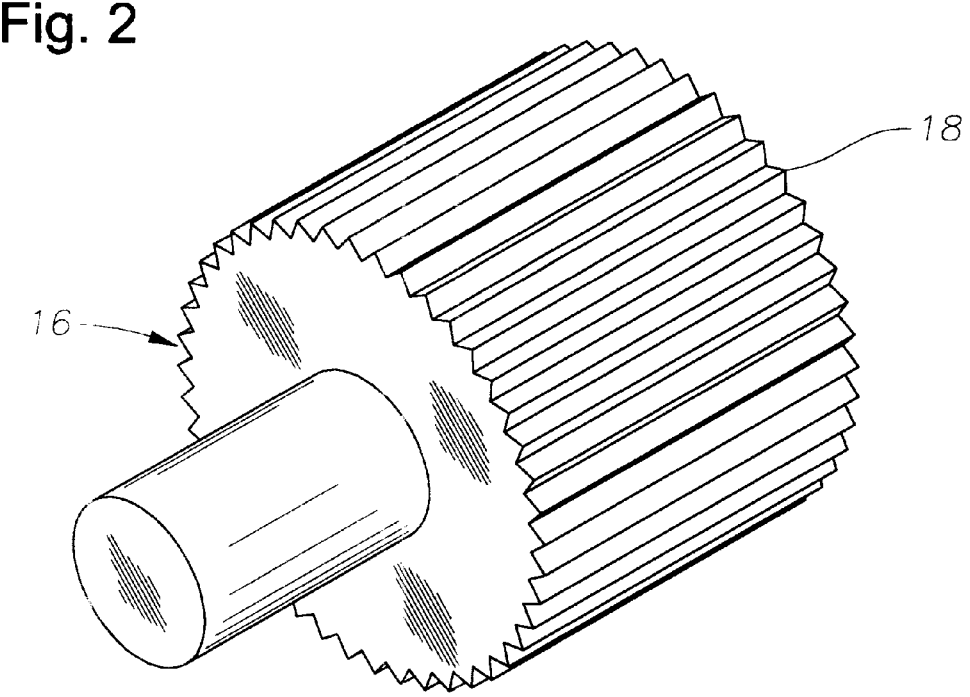
FIG. 2 shows a machine direction orientation roller.
Figure 3:
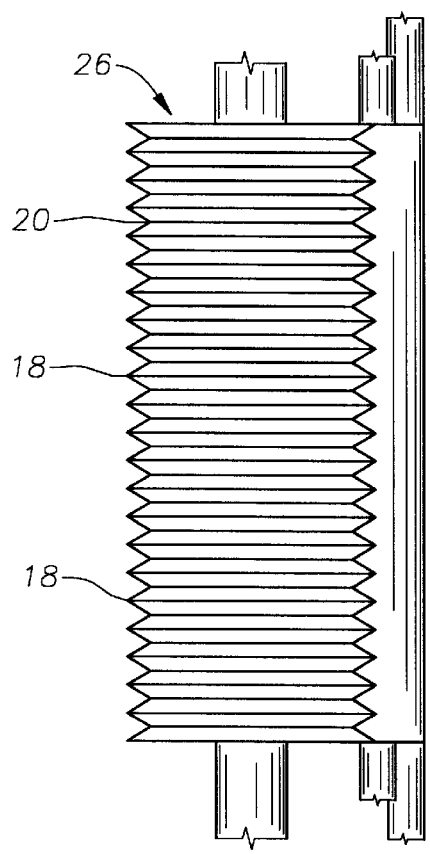
FIG. 3 shows a transverse direction orientation roller.

Machine direction orientation is accomplished by stretching the film through a gear like pair of rollers 16 as shown in FIG. 2. Transverse direction orientation is accomplished by stretching the film through a pair of disk-like rollers as shown in FIG. 3.

The preferred embodiment employs rollers with a tooth pitch, W=0.080", however a pitch of about 0.040" to 0.500" is also acceptable. The tooth depth (d), is preferably 0.100", however, a tooth depth of about 0.030" to 0.500" is also acceptable. For the transverse direction orientation rollers, as shown in FIG. 3, the depth may be up to about 1.000" as mechanical interference is less of an issue with the transverse direction rollers. The preferred embodiment employs interdigitating rollers that can be temperature controlled from about 50° F. to about 210° F. More preferred is a temperature range of from about 70° F. to about 190° F. Even more preferred is a temperature range from about 85° F. to about 180° F. And most preferred is a temperature range from about 95° F. to about 160° F. Roll temperature may be maintained through the internal flow of a heated or cooled liquid, an electrical system, an external source of cooling/heating, combinations thereof, and other temperature control and maintenance methods which will be apparent to those of ordinary skill in the art. The preferred embodiment is internal flow of a heated or cooled liquid through the rollers.

The depth of interengagement of the roller teeth determines the amount of orientation imparted on the film. A balance must be drawn between the depth of engagement of the roller teeth and the level of filler in the film, as many physical properties of the film are affected as depicted in the following table.

Relationships Between Process and Formulation Factors

Relationships between process and formulation factors

|  | Adjust | WVTR | Dart Impact | Basis Weight | CD Tensile | MD Tear |
|---|---|---|---|---|---|---|
| CaCO$_3$ | Increase | Increase | Increase |  |  | decrease |
| MD Orientation | Increase | Increase | decrease | decrease |  | decrease |
| TD Orientation | Increase | Increase | decrease | decrease | Decrease |  |
| Roll Temperature | Increase | Increased |  | decrease |  |  |

Properties of Films Produced

WVTR

In an embodiment of the present invention, certain films and articles made therefrom have higher WVTR than previously thought possible. The WVTR of such films should be above about 100 g/m$^2$/24 hr@37.8° C., 100% RH, preferably above about 1000 g/m$^2$/24 hr@37.8° C., 100% RH, more preferably above about 2000 g/m$^2$/24 hr@37.8° C., 100% RH. Some applications benefit from film with a WVTR at or above about 10,000 g/m$^2$/24 hr@37.8° C., 100% RH.

Test Methods

Water Vapor Transmission Rate (WVTR)

Both a Mocon W1, and a Mocon W600 instrument are used to measure water evaporated from a sealed wet cell at 37.8° C. through the test film and into a stream of dry air or nitrogen. It is assumed that the relative humidity on the wet side of the film is near 100%, and the dry side is near 0%. The amount of water vapor in the air stream is precisely measured by a pulse modulated infra red (PMIR) cell. Following appropriate purging of residual air, and after reaching a steady state of water vapor transmission rate, a reading is taken. WVTR of the test films are reported at Grams of Water/Meter$^2$/Day@37° C. The output of the unit has been calibrated to the results obtained with a film of known WVTR. The testing protocols are based on ASTM 1249-90 and the use of a reference film, such as Celgard 2400, which has a WVTR of 8700 g/m$^2$/day@37.8° C. The diagram depicted in FIG. 4 illustrates the basic operation of the Mocon units.

Mocon W1

Figure 4:
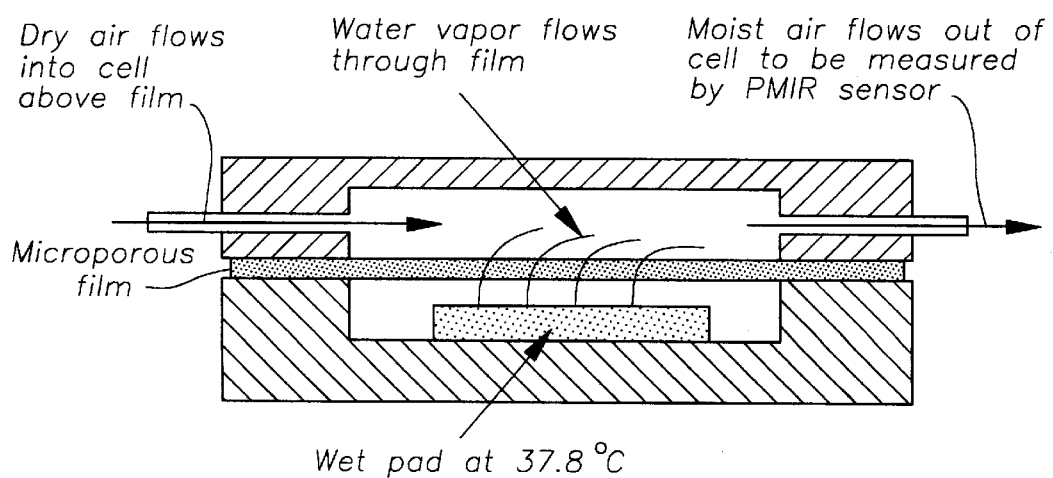
FIG. 4 shows a cross-section of a WVTR test cell.

As illustrated generally by reference to FIG. 4, the Mocon W1 has a single test cell and an analog chart recorder. Air is pumped through a desiccant dryer, then through the test cell, and then past the PMIR sensor. A five-minute purge of residual air is followed by a six-minute test cycle with controlled air flow. The result is a steady state value for WVTR. The purge and test cycles are controlled manually. The unit is calibrated to a film with a known WVTR every twelve hours. Calibration results are control charted and adjustments are made to the instrument calibration accordingly.

Mocon W600

The Mocon W600 has six measurement cells with PMIR data fed into a computer. Nitrogen is fed through a desiccant dryer, then through the active test cell, then past the PMIR sensor. In addition to data compilation, a computer controls test cycle sequencing. All cells are purged simultaneously for an eight-minute period. This is followed by an eight-minute test cycle for each of the six measurement cells. Total testing time is fifty-six minutes. Two of the six measurement cells always measure reference films with a known WVTR.

EXAMPLES

Example 1

Experimental Grade 400-6-1

A blend of 57% ECC FilmLink 400 CaCO$_3$ was combined with 33% Exxon PD 7623 Impact Copolymer, 2% Exxon LD-200.48, and 8% Exxon Exact 3131 oriented in interdigitating rolls of 0.80" pitch. The MD depth of engagement was 0.020", and the TD depth of engagement was 0.040". The temperature of the interdigitating rolls was 140° F.

Example 2

Experimental Grade 400-6-2

A blend of 57% ECC FilmLink 400 CaCO$_3$ was combined with 33% Exxon PD 7623 Impact Copolymer, 2% Exxon LD-200.48, and 8" Exxon Exact 3131 oriented in interdigitating rolls of 0.080" pitch. The MD length of engagement was 0.020", and the TD depth of engagement was 0.040". The temperature of the interdigitating rolls was 110° F.

Example 3

Experimental grade 400-6-3

A blend of 57% ECC FilmLink 400 CaCO$_3$ was combined with 33% Exxon PD 7623 Impact Copolymer, 2% Exxon LD-200.48, and 8% Exxon Exact 3131 oriented in interdigitating rolls of 0.080" pitch. The MD depth of engagement was 0.020", and the TD depth of engagement was 0.040". The temperature of the interdigitating rolls was 70° F.

As can be seen from the following table, the WVTR rise from a roll temperature of 70° F. (considered ambient temperature) to 110° F., and then 140° F. is dramatic, unexpected and surprising.

Table of Example Film Properties

|  | Example 1 | Example 2 | Example 3 |
|---|---|---|---|
| Grade Number | 400-6-1 | 400-6-2 | 400-6-3 |
| Roll Temperature (° F.) | 140 | 110 | 70 |
| Basis Weight (gm/sqm) | 43 | 40 | 39 |
| WVTR (gm/sqm/day) | 4100 | 3000 | 1900 |
| Dart Impact Strength (gm) | 240 | 300 | 300 |
| MD Ultimate (gm/in) | 1585 | 1532 | 1453 |
| MD Elongation (%) | 408 | 431 | 442 |
| TD @ 5% (gm/in) | 457 | 389 | 388 |
| TD Ultimate (gm/in) | 785 | 1166 | 1049 |
| TD Elongation (%) | 351 | 358 | 357 |
| MD Elmendorf Tear Strength (gm) | 166 | 208 | 205 |

A linear regression analysis reveals that with the above fixed formulation, depth of activation water vapor transmission rate is predicted by the following equation:

$$WVTR = -329.73 + 31.216 * \text{Roller Temperature (° F.)}$$

Changes and modifications in the specifically described embodiments can be carried out without departing from the scope of the invention which is intended to be limited only by the scope of the appended claims.

What I claim is:

1. A process for adjusting the WVTR of a breathable filled film manufactured using interdigitating grooved rollers, said process comprising:
   a) extruding a precursor film including:
      (i) a polyolefin resin having at least 20% polypropylene by wt. % of said polyolefin resin, and
      (ii) a filler in the range of from 20 to 70 wt. % of said precursor film:
   b) heating at least one pair of interdigitating grooved rollers to a predetermined temperature in the range of from 110° F. to 140° F., said predetermined temperature of the rollers being determined by a desired WVTR for the breathable film;
   c) passing said precursor film between said interdigitating grooved rollers to heat and stretch said precursor film to produce the breathable film, having a WVTR greater than 1000 g/m$^2$/day at 38° C. and 90% relative humidity and having permanent elongation in a stretched direction.

2. A process for adjusting the WVTR of a breathable filled film manufactured using interdigitating grooved rollers, said process comprising:
   a) extruding a precursor film from a polyolefin blend including;
      (i) at least 33 wt. % polypropylene,
      (ii) at least 2 wt. % low density polyethylene, and
      (iii) at least 57 wt. % calcium carbonate filler
   b) heating at least one pair of interdigitating grooved rollers to a predetermined temperature in the range of from 110° F. to 140° F., said predetermined temperature of the rollers being determined by a desired WVTR for the breathable film;
   c) passing said precursor film between said interdigitating grooved rollers to heat and stretch said precursor film to produce the breathable film, having a WVTR greater than 1000 g/m$^2$/day at 38° C. and 90% relative humidity and having permanent elongation in a stretched direction.

* * * * *